United States Patent [19]

Hagedorn-Olsen

[11] 4,361,398

[45] Nov. 30, 1982

[54] REPROGRAPHIC CAMERA

[75] Inventor: Jens Hagedorn-Olsen, Hornbaek, Denmark

[73] Assignee: Océ-Nederland B.V., Venlo, Netherlands

[21] Appl. No.: 181,100

[22] Filed: Aug. 25, 1980

[30] Foreign Application Priority Data

Sep. 25, 1979 [NL] Netherlands ............... 7907114

[51] Int. Cl.³ .............................. G03B 27/62
[52] U.S. Cl. .................................... 355/75
[58] Field of Search ............... 355/74, 75, 76, 23, 355/72

[56] References Cited

U.S. PATENT DOCUMENTS

| | | | |
|---|---|---|---|
| 1,692,544 | 11/1928 | Caps et al. | 355/23 |
| 2,799,204 | 7/1957 | Blatherwick | 355/76 |
| 3,627,416 | 12/1971 | Benson | 355/75 |
| 3,762,815 | 10/1973 | Friedel | 355/76 |

FOREIGN PATENT DOCUMENTS

| | | |
|---|---|---|
| 2518394 | 11/1976 | Fed. Rep. of Germany . |
| 107418 | 3/1925 | Switzerland . |
| 733429 | 7/1955 | United Kingdom ............... 355/75 |
| 1077133 | 7/1967 | United Kingdom . |

*Primary Examiner*—Monroe H. Hayes
*Attorney, Agent, or Firm*—Albert C. Johnston

[57] ABSTRACT

A reprographic camera for exposing an original to illumination that is passed through an optical system to light-sensitive material is provided with a holder having at least two mounting surfaces onto each of which an original can be fitted, and which is rotatable about an axis perpendicular to the optical axis of the optical system so that the holder can be set in a plurality of positions in each of which one of the mounting surfaces faces the optical system. One of the mounting surfaces is located at a greater distance than another from the axis of rotation of the holder so that the respective active positions of these surfaces are at different distances from the objective of the optical system, thus providing different reproduction ratios.

7 Claims, 3 Drawing Figures

REPROGRAPHIC CAMERA

The present invention relates to a reprographic camera of a kind that includes a holder capable of holding an original to be reproduced, an optical system comprising an objective, and a holder for holding the light-sensitive material.

A known camera of that kind is disclosed in German Pat. No. 1 472 977. In the usual use of this known camera, whenever an illumination of the light-sensitive material has been completed both the light-sensitive material and the original must be replaced. This requires the operator to perform two operations, so that for a considerable length of time the camera is not being used effectively.

The principal object of the present invention is to provide a camera of the kind mentioned above with which the time elapsing between two succeeding exposures can be shortened to a considerable extent.

According to the invention this object is achieved by a construction in which the holder for holding the original is provided with at least two mounting surfaces onto each of which an original can be fitted, and this holder is rotatable about an axis perpendicular to the optical axis of the optical system and is disposable in a plurality of positions in each of which one of the mounting surfaces faces the optical system of the camera and is perpendicular to its optical axis.

By virtue of this construction, during the illumination of an original fitted on one of the mounting surfaces a subsequent original can already have been fitted on another mounting surface, and as a result the time necessary to prepare the camera for the next illumination is restricted to that required for changing the light-sensitive material and turning the holder for the originals.

According to another feature of the invention, the original holder is provided with two of the mounting surfaces disposed diametrically opposite to each other relative to the axis of rotation. Consequently, during illumination of one mounting surface the other surface is optimally accessible for mounting an original on it.

In a preferred embodiment of the invention, the distance between the axis of rotation of the original holder and a first mounting surface is smaller than the distance between the axis of rotation and the second mounting surface. Thus, the optical distance between an original mounting surface in operative position and the objective of the camera is smaller when the second mounting surface is in operative position than it is when the first mounting surface is in its operative position. As a result the second mounting surface is eminently suitable for originals that have to be magnified very highly.

The invention thus is particularly suitable for reproducing transparent originals, which often must be magnified very highly. For this purpose a light source is arranged between the two mounting surfaces and the second mounting surface is transparent.

The above mentioned and other objects, features and advantages of the invention will be further evident from the following detailed description and the accompanying drawings of a camera embodying the invention. In the drawings.

Figure 1:
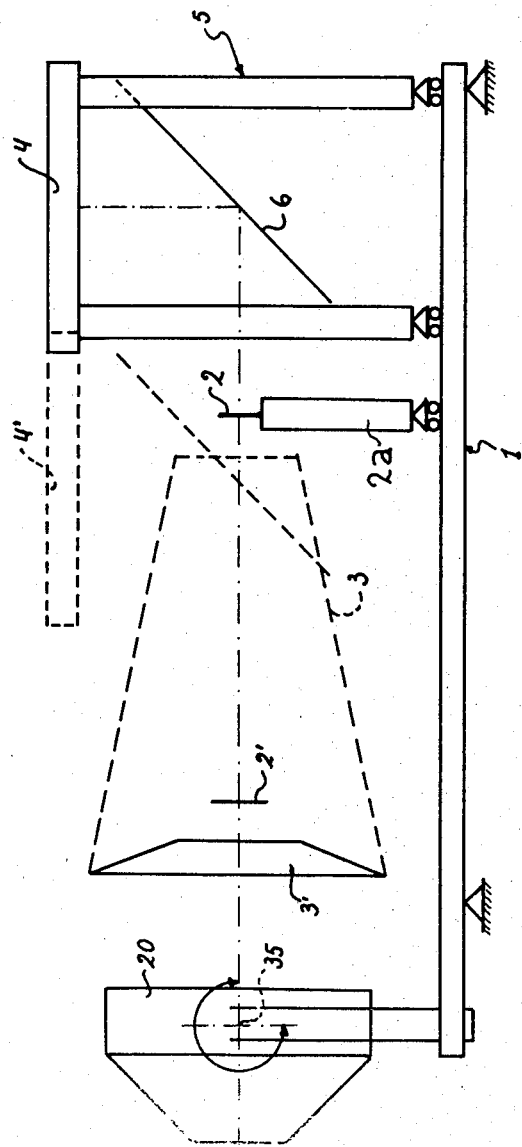
FIG. 1 is a schematic side elevational view of a reprographic camera embodying the invention.
Figure 2:
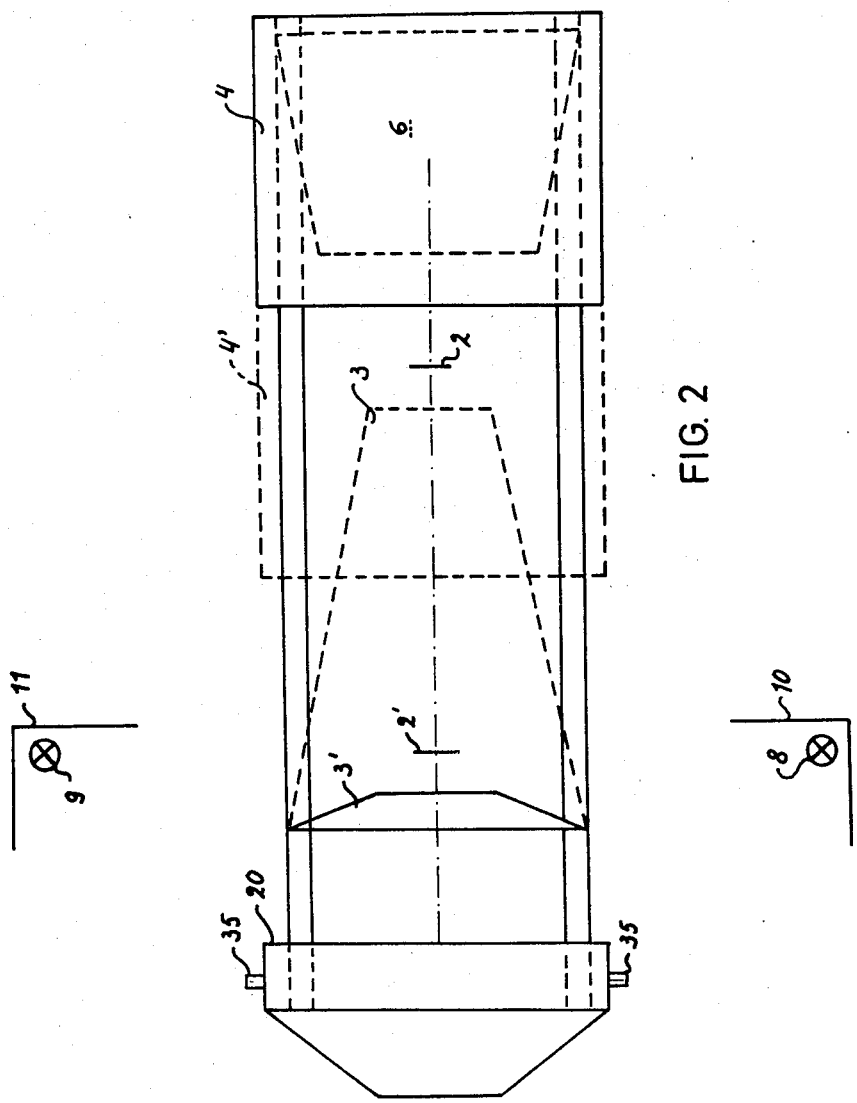
FIG. 2 is a schematic plan view thereof.

As shown diagrammatically in FIGS. 1 and 2, the reprographic camera comprises a frame 1 supporting the functional parts of the camera. These functional parts include a holder 20 for the original, which, as indicated in FIG. 1, is arranged so that it is capable of rotating in the frame through 270 degrees about an axis at 35. The holder 20 will be described below in more detail.

An objective 2 is mounted on a carrier 2a so that it can move along the frame 1 between two positions indicated at 2 and 2', respectively. A bellows 3 is connected with the objective 2 to reduce the amount of scattered light. A holder 4 for holding light-sensitive material is mounted on the frame so that it can be moved via a carriage 5 between different positions indicated at 4 and 4', respectively. The holder 4 is arranged to hold a light-sensitive material in a horizontal plane, and a mirror 6 is mounted in the carriage 5 at an angle of 45 degrees so that the image of an original positioned vertically can be projected via the objective 2 and the mirror 6 onto the light-sensitive material held in the holder 4. Thus the original can be exposed either in reflex by means of lamps 8 and 9 arranged in reflectors 10 and 11 (FIG. 2) or by transmission of light through the original as described more fully below.

The arrangement described permits the optical ratio of reproduction of an original to be varied continually so that a sharp image of the original will be projected onto the light-sensitive material. The carrier of the objective 2, instead of holding a single objective, can hold various objectives any one of which can be positioned optionally in the exposure path, depending upon the desired ratio of reproduction.

Figure 3:
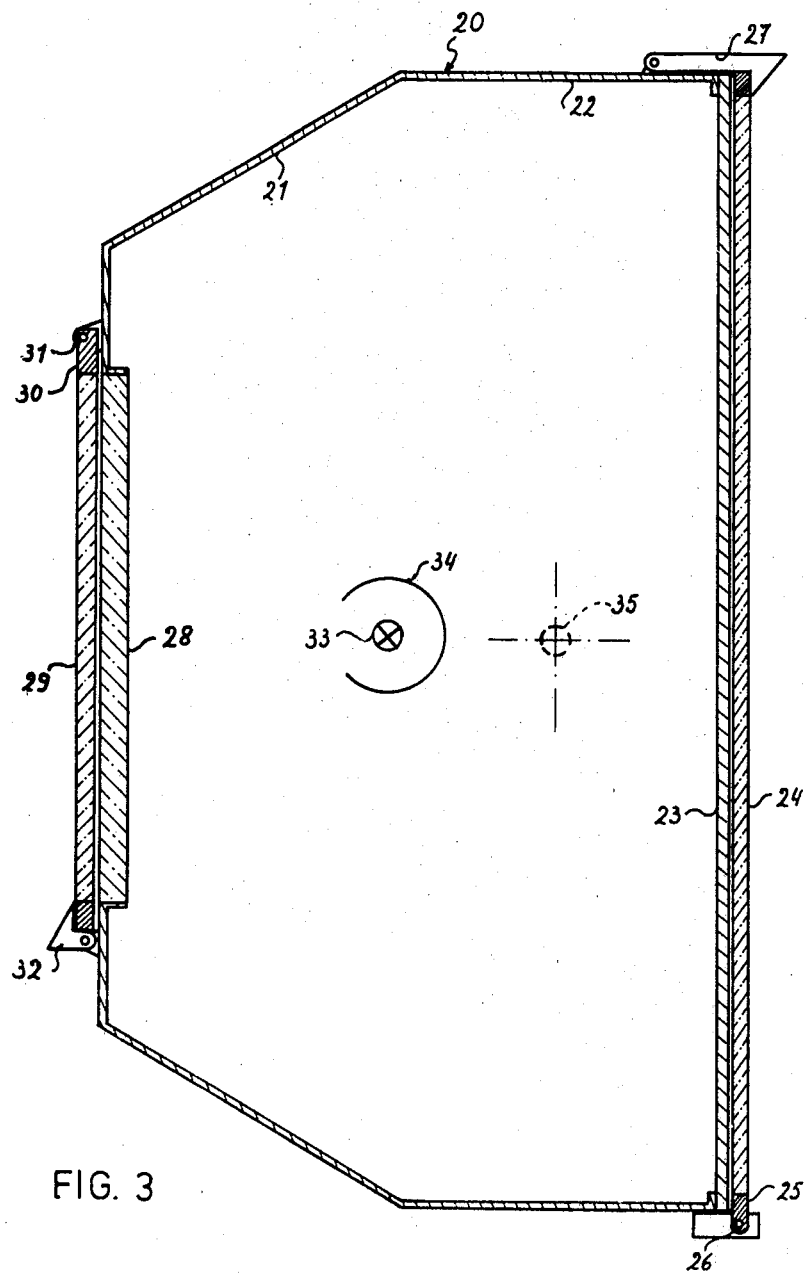
FIG. 3 is a schematic cross sectional view of a holder for holding the original as used in the camera of FIGS. 1 and 2.

The holder 20 for the original, as shown more particularly in FIG. 3, is a box-shaped body provided at one side thereof with a portion 21 having the shape of a truncated pyramid and, at the other side, with a portion 22 having the shape of a rectangular parallelepiped. At the side of the parallelepiped-shaped portion of the holder 20 is closed by an opaque plate 23. A glass plate 24 engaged in a frame 25 is connected to the holder 20 by a hinge 26 so that the glass plate can be fixed by a latching device 27 in a position in which it lies over and against the plate 23. Thus an original can be placed and clamped between the plate 23 and glass plate 24 in position to be illuminated by the lamps 8 and 9 so that an image of the original will be projected onto the light-sensitive material held in the holder 4.

At the side of the holder portion 21 having the shape of a truncated pyramid, the holder is closed by a glass plate 28. A glass plate 29 engaged in a frame 30 is connected to the holder 20 by a hinge 31 so that this glass plate can be placed and then fixed by a latching device 32 in a position in which it lies over and against the glass plate 28. Thus an original can be inserted and clamped between the glass plates 28 and 29 and positioned by the holder 20 so as to be illuminated, for instance by the lamps 8 and 9, so that an image of this original will be projected onto the light-sensitive material held in the holder 4.

The exposure of an original held between the glass plates 28 and 29, however, can also be effected by transmission of light through the original. For that purpose a lamp 33 arranged inside a reflector 34 is provided within the holder 20. Further, an original placed between the glass plates 28 and 29 can be exposed simultaneously in reflex and in transmission by switching on the lamps 8, 9 and 33 at the same time.

In order to bring either of the two mounting surfaces bounded respectively by the plates 23 and 24 and the plates 28 and 29 into the operative position for projecting an image, two shaft journals 35 are fixed to and protrude oppositely from the holder 20 for rotation in bushings provided in upright side members of the frame 1. The shaft journals 35 have a common axis which intersects and is perpendicular to the optical axis of the camera. Furthermore, the axis of rotation at 35 is parallel to the original mounting surfaces of the plates 23 and 28, respectively. The location of the axis of the shaft journals 35 is chosen so that the plate 23 is spaced away from this axis by a distance smaller than the distance between the plate 28 and the axis of the journals 35. Thus, the mounting surface bounded by the plates 28 and 29 in their operative position is spaced more closely to the objective than the mounting surface bounded by the plates 23 and 24, with the result that originals inserted between the plates 28 and 29 can be projected at higher ratios of reproduction.

The holder 20 for holding originals can be turned about the axis of the shaft journals 35 through 270 degrees, so that the two surfaces can be brought alternately into operative position, i.e., into a position in which one or the other of them faces the objective 2 and is perpendicular to its optical axis. Any suitable means can be provided for fixing the holder 20 in either of its two operative positions. In addition, because this holder is turnable through an arc of 270 degrees, the mounting surface bounded by the plates 23 and 24, and the mounting surface bounded by the plates 28 and 29 as well, can be positioned horizontally at the top of the holder 20, i.e., in an upwardly facing position in which the fitting of an original between the plates can be effected most simply by a person using the camera. If desired, means may also be present for fixing the holder in those two positions.

It will be apparent that the present invention is not confined to the embodiment which has been illustrated and described in detail and that the new features and arrangements herein disclosed can be embodied in various other forms of apparatus, and with variations in the relative positioning of the functional elements, without departing from the scope of the invention which is intended to be defined by the appended claims.

I claim:

1. In a reprographic camera including means for holding an original in a position to be exposed to illumination, an optical system comprising an objective in a light path from the original and means for holding light-sensitive material across said path beyond the objective, the improvement wherein said means for holding an original comprises a holder provided with at least two mounting surfaces onto each of which an original can be fitted, said holder being rotatable about an axis perpendicular to the optical axis of said optical system and being settable in a plurality of positions relative to its axis of rotation, in each of which one of said surfaces lies in a path of illumination and faces the optical system and is perpendicular to its optical axis, the distance between said axis of rotation and one of said mounting surfaces being smaller than the distance between said axis of rotation and a second of them, whereby the reproduction ratio of an original mounted on said second surface is greater than that of an original mounted on said one surface.

2. A camera according to claim 1, said holder being provided with two said mounting surfaces arranged diametrically opposite to each other relative to said axis of rotation, said holder having a light source arranged therein between said two mounting surfaces and at least one of said two mounting surfaces being transparent and when in exposing position being in the path of light from said source.

3. A camera according to claim 1, said second mounting surface being transparent and said holder having a light source arranged therein for passing light through an original mounted on said second surface in exposing position.

4. In a reprographic camera including means for holding an original in a position to be exposed to illumination, an optical system comprising an objective in a light path from the original and means for holding light-sensitive material across said path beyond the objective, the improvement wherein said means for holding an original comprises a holder provided with at least two mounting surfaces onto each of which an original can be fitted, said holder being rotatable about an axis perpendicular to the optical axis of said optical system and being settable in a plurality of positions relative to its axis of rotation, in each of which one of said surfaces lies in a path of illumination and faces the optical system and is perpendicular to its optical axis, said holder being provided with two said mounting surfaces arranged diametrically opposite to each other relative to said axis of rotation, the distance between said axis of rotation and one of said mounting surfaces being smaller than the distance between said axis of rotation and a second of them, said holder having a light source arranged therein between said two mounting surfaces, and at least said second of said two mounting surfaces being transparent and when in exposing position being in the path of light from said source, whereby the reproduction ratio of an original mounted on said second surface is greater than that of an original mounted on said one surface.

5. A camera according to claim 1, 2, 3 or 4 said holder comprising a box-like body having at one side thereof a parallelepiped-shaped portion closed by one of said mounting surfaces and having at the diametrically opposite side thereof a portion shaped as a truncated pyramid and closed by a second of said mounting surfaces.

6. A camera according to claim 1, 2, 3, or 4, said holder being turnable through an arc of 270° about said axis of rotation so that any of said mounting surfaces may be disposed, by turning said holder, in any of several positions including a position in which the mounting surface faces upward.

7. A camera according to claim 5, said holder being turnable through an arc of 270° about said axis of rotation so that any of said mounting surfaces may be disposed, by turning said holder, in any of several positions including a position in which the mounting surface faces upward.

* * * * *